US005762700A

United States Patent [19]

Memon et al.

[11] Patent Number: 5,762,700
[45] Date of Patent: Jun. 9, 1998

[54] CATALYTIC PROCESS FOR PRODUCING FREE RADICALS ON CRUMB RUBBER

[75] Inventors: Ghulam M. Memon, Sterling; Brian H. Chollar, Falls Church, both of Va.

[73] Assignee: The United States of America as represented by the Secretary of Transportation, Washington, D.C.

[21] Appl. No.: 904,777

[22] Filed: Aug. 1, 1997

[51] Int. Cl.⁶ .......................... C09D 195/00; C08F 8/06; C08F 36/00
[52] U.S. Cl. ........................ 106/284.05; 106/284.01; 106/281.1; 525/192; 525/194; 525/195; 525/331.9
[58] Field of Search ..................... 525/192, 194, 525/195, 331.9; 106/284.01, 284.05, 281.1

[56] References Cited

U.S. PATENT DOCUMENTS

| | | | |
|---|---|---|---|
| 4,833,205 | 5/1989 | Bauman et al. | 525/123 |
| 5,558,704 | 9/1996 | Masuda et al. | 106/281.1 |
| 5,693,714 | 12/1997 | Bauman et al. | 525/104 |
| 5,704,971 | 1/1998 | Memon | 106/281.1 |

*Primary Examiner*—David Brunsman
*Attorney, Agent, or Firm*—Otto M. Wildensteiner

[57] ABSTRACT

Increasing the usable temperature range of asphalts that contain crumb rubber particles by treating the crumb rubber with hydrogen peroxide in the presence of a catalyst such as Fenton's reagent, dioxomolybdenum bis(acetylacetonate), cobalt salt, tall oil, p-toluene sulfonic acid (PTSA), and others.

13 Claims, No Drawings

CATALYTIC PROCESS FOR PRODUCING FREE RADICALS ON CRUMB RUBBER

STATEMENT OF GOVERNMENT INTEREST

The present invention may be used by or for the Government of the United States without the payment of any royalties thereon or therefor.

BACKGROUND

Finely ground crumb rubber is increasingly being added to asphalt in order to increase its usable temperature range. It has been found (see application Ser. No. 08/662,750 filed Jun. 20, 1996) that the crumb rubber and asphalt interact more readily and completely, resulting in an improved asphalt, if free radicals are generated on the surface of the crumb rubber. The above application discloses the use of hydrogen peroxide to generate these free radicals.

It has been further found that using hydrogen peroxide alone does not generate as many free radicals as it is possible to generate on the surface of the crumb rubber particles. This means that the crumb rubber particles do not interact as completely as possible with the asphalt and consequently the usable temperature range is not increased as much as possible.

SUMMARY

Briefly, it has been found that the production of free radicals on the surface of crumb rubber using an oxidizer such as hydrogen peroxide can be increased through the use of a catalyst. The amount of catalyst used is approximately 0.03–0.07 millimoles per gram of crumb rubber. Suitable catalysts are Fenton's reagent, dioxomolybdenum bis(acetylacetonate), cobalt salt, tall oil, p-toluene sulfonic acid (PTSA), and others. The proof of the generation of additional free radical sites lies in the fact that asphalts that contain crumb rubber that has been treated with a catalyst in the presence of hydrogen peroxide have an increased temperature range compared to asphalts that contain crumb rubber that has been treated with hydrogen peroxide only, something that could occur only as a result of increased free radical sites on the crumb rubber.

OBJECTS OF THE INVENTION

Accordingly, it is an object of the present invention to provide a method of improving the production of free radicals on crumb rubber.

It is a further object of the present invention to provide crumb rubber which increases the usable temperature range of asphalts compared to prior art crumb rubber that has been treated with hydrogen peroxide only.

DESCRIPTION OF THE PREFERRED EMBODIMENT

As discussed in application Ser. No. 08/662,750, generating free radicals on the surface of crumb rubber that is to be added to asphalt to improve its useful temperature range has been found to improve the interaction of the asphalt with the crumb rubber, and hydrogen peroxide has been found to be a convenient substance to use for this purpose.

It has been further found that the generation of free radicals on the surface of crumb rubber can be improved by the addition of a catalyst such as Fenton's reagent, dioxomolybdenum bis(acetylacetonate), cobalt salt, tall oil, p-toluene sulfonic acid (PTSA), etc. The catalyst can be added to the mix of crumb rubber and hydrogen peroxide when the free radicals are to be generated, or the crumb rubber can be treated with hydrogen peroxide alone and the catalyst added when the treated crumb rubber is added to the hot asphalt.

Tests have shown that crumb rubber that has been treated with hydrogen peroxide as well as a catalyst considerably increases the usable temperature range of asphalts compared to crumb rubber that has been treated with just hydrogen peroxide. One of the asphalts studied was Shell Oil Asphalt. Unmodified, this asphalt had a temperature grading of 65–23. Modified with crumb rubber that was treated with hydrogen peroxide only, its temperature grading was 74–28. When modified with crumb rubber that had been treated with hydrogen peroxide in the presence of p-toluene sulfonic acid (PTSA), its temperature grading was 78–31. Thus the PTSA catalyst added 4 degrees to the upper limit of its usable temperature range as well as lowered its minimum usable temperature 3 degrees compared to crumb rubber that had been treated with hydrogen peroxide only.

Another asphalt studied was Navajo Asphalt. Unmodified, this asphalt had a temperature grading of 50–22. When modified with crumb rubber that had been treated with hydrogen peroxide only it had a temperature grading of 60 –28. When modified with crumb rubber that had been treated with hydrogen peroxide in the presence of PTSA it had a temperature grading of 63–32, an increase in upper limit of usable temperature of 3 degrees and a decrease in lower limit of usable temperature of 4 degrees compared to crumb rubber that had been treated with hydrogen peroxide only.

The above results show that the catalyst allowed the formation of more free radical sites on the surface of the crumb rubber particles, which in turn allowed the formation of more large and small molecular size particles in the asphalt. The increase in large molecular size particles raised the upper limit of usable temperature, and the increase in small molecular size particles lowered the lower limit of usable temperature.

What is claimed is:

1. The method of generating free radicals on the surface of crumb rubber which comprises treating the crumb rubber particles with an oxidizer and a catalyst which improves the production of said free radicals.

2. The method of claim 1 wherein said oxidizer comprises hydrogen peroxide.

3. The method of claim 1 wherein said catalyst comprises Fenton's reagent.

4. The method of claim 1 wherein said catalyst comprises dioxomolybdenum bis(acetylacetonate).

5. The method of claim 1 wherein said catalyst comprises cobalt salt.

6. The method of claim 1 wherein said catalyst comprises tall oil.

7. The method of claim 1 wherein said catalyst comprises p-toluene sulfonic acid.

8. The method of increasing the usable temperature range of asphalt which comprises treating crumb rubber with hydrogen peroxide in the presence of a catalyst and adding the treated crumb rubber to the asphalt.

9. The method of claim 8 wherein said catalyst comprises Fenton's reagent.

10. The method of claim 8 wherein said catalyst comprises dioxomolybdenum bis(acetylacetonate).

11. The method of claim 8 wherein said catalyst comprises cobalt salt.

12. The method of claim 8 wherein said catalyst comprises tall oil.

13. The method of claim 8 wherein said catalyst comprises p-toluene sulfonic acid.

* * * * *